(12) United States Patent
Gomez et al.

(10) Patent No.: US 10,162,138 B2
(45) Date of Patent: Dec. 25, 2018

(54) SELF-ALIGNING DEFLECTOR DEVICE FOR TRANSMISSION LINE OFFSET CORRECTION

(71) Applicant: The Trustees of Princeton University, Princeton, NJ (US)

(72) Inventors: Michael G. Gomez, Lawrenceville, NJ (US); Cara A. Bagley, Kendall Park, NJ (US); Benjamin J. Tobias, Oceanside, CA (US); Ali Zolfaghari, Princeton, NJ (US); Alexandros Gerakis, Plainsboro, NJ (US); Mary Angelique Demetillo, Union, NJ (US)

(73) Assignee: The Trustees of Princeton University, Princeton, NJ (US)

( * ) Notice: Subject to any disclaimer, the term of this patent is extended or adjusted under 35 U.S.C. 154(b) by 0 days.

(21) Appl. No.: 15/259,278

(22) Filed: Sep. 8, 2016

(65) Prior Publication Data
US 2018/0067270 A1    Mar. 8, 2018

(51) Int. Cl.
| | | |
|---|---|---|
| *G02B 6/42* | (2006.01) |
| *F16H 21/44* | (2006.01) |
| *G02B 7/182* | (2006.01) |
| *F16H 35/18* | (2006.01) |

(52) U.S. Cl.
CPC ........... *G02B 6/4226* (2013.01); *F16H 21/44* (2013.01); *F16H 35/18* (2013.01); *G02B 6/4244* (2013.01); *G02B 7/1824* (2013.01)

(58) Field of Classification Search
None
See application file for complete search history.

(56) References Cited

U.S. PATENT DOCUMENTS 5,979,927 A * 11/1999 Hale ...................... B60R 1/003
248/277.1

* cited by examiner

*Primary Examiner* — Jennifer D. Carruth
(74) *Attorney, Agent, or Firm* — Norris McLaughlin, PA (57) ABSTRACT

Disclosed is a self-aligning mirror device for transmission line offset correction. The disclosed self-aligning mechanism automatically adjusts deflectors to couple radiation between two or more offset waveguides or optical fibers.

9 Claims, 9 Drawing Sheets

SELF-ALIGNING DEFLECTOR DEVICE FOR TRANSMISSION LINE OFFSET CORRECTION

This invention was made with US Government support under Grant No. DE-AC02-09CH11466 awarded by the Department of Energy. The US Government has certain rights in the invention.

The present invention relates to deflector devices which are useful in deflecting radiation between two offset or non-collinear locations or points. The present method also relates to methods of deflecting radiation between two offset or non-collinear locations or points.

In one aspect there is disclosed a self-aligning device which automatically adjusts deflectors present in the device, in order to couple radiation between two or more offset or non-collinear locations or points. Such radiation may be within any part of the spectrum, including light without or out of the visible range. The self-aligning device may operable dynamically wherein two or more parts of the device change their relative positions over time during the use of the device. The self-aligning device may be operable statically wherein the parts of the device do not change their relative positions over time during the use of the device.

In a further aspect there is disclosed a self-aligning mirror device for transmission line offset correction. The disclosed self-aligning mirror device automatically adjusts mounted mirrors present in the self-aligning device device, in order to couple radiation between two or more offset or non-collinear locations or points. The self-aligning device can be easily adapted for any arbitrary wavelength so that it may be incorporated into any microwave or optical system where the alignment of two collinear paths is unknown or may vary during operation of the system.

There is also disclosed a self-aligning deflector device for transmission line offset correction.

In a still further aspect there is provided a method for coupling two waveguides or two radiation sources/radiation collectors which are offset or non-collinear with respect to each other, which method includes the steps of: providing a self-aligning device having deflectors, e.g, mirrors, and directing a source of radiation, (e.g, optical radiation, laser, maser or other,) from a first radiation source or waveguide, through the deflectors, to a second radiation waveguide or receiver (or collector). In such a manner the self-aligning device may be used to deflect radiation between two offset or non-collinear locations or points. The above method may also be used in a bidirectional mode, wherein each of the first and second radiation sources or waveguides operate to both receive, and to transmit radiation therethrough.

The operating principles of the self-aligning device of the invention, and preferred embodiments thereof are discussed more comprehensively with reference to the drawing figures.

In this application, and with reference to the drawings, the term "pivot" is intended to describe and encompass any linkage which allows for the relative displacement, preferably a rotational displacement of the two (or more) parts or elements which are interconnected by the "pivot". Without limitation, such include pins, shafts, bearings or other which are coupled and appropriate manner, again, without limitation by mounting plates, mounting holes, perforations or other to two different elements or parts of the self-aligning device. It is to be understood that the selection of an appropriate "pivot" is part dictated by the overall construction, dimensions of a self-aligning device and its intended use, and further that a self-aligning device according to the invention may be constructed using one type, or a plurality of different types of pivots.

It this application, and particularly with reference to the drawings, the term "pivot point" is intended to be understood as the centerline, or rotational axis of a pivot. Such "pivot points" are useful in determining the overall required dimensions or lengths of one or more parts or elements of the self-deflecting device of the present invention and its overall configuration which in certain parts thereof, must be maintained in certain geometrical relationships with respect to further parts or elements. Certain dimensions of certain parts or elements are made with reference to the distance between pivot points.

Figure 1A:
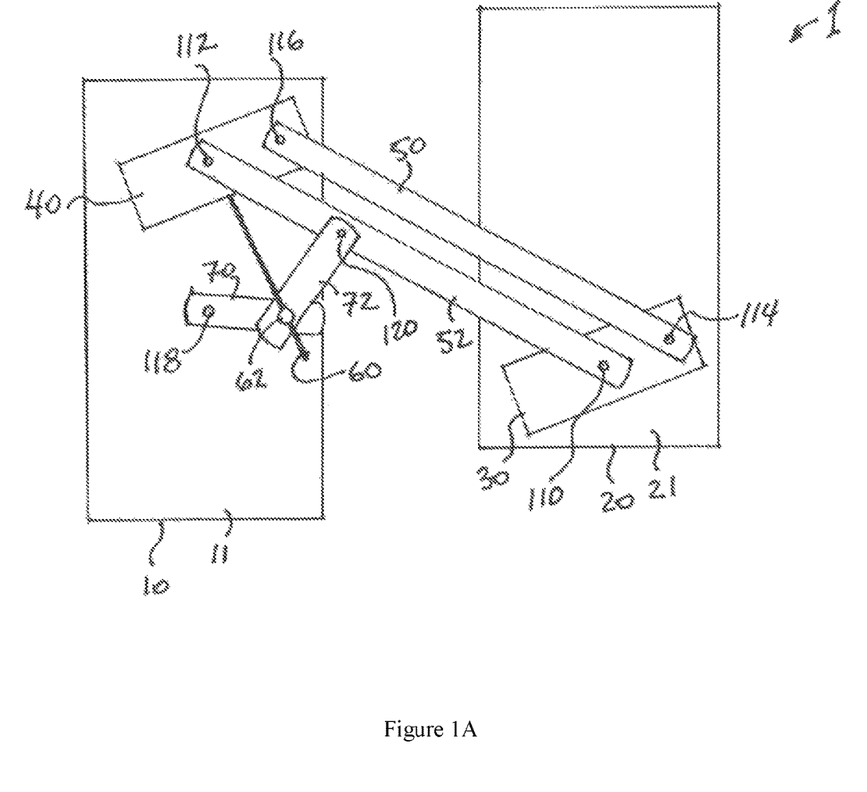
FIG. 1A illustrates a schematic top view, elements of a self-aligning device.
Figure 1B:
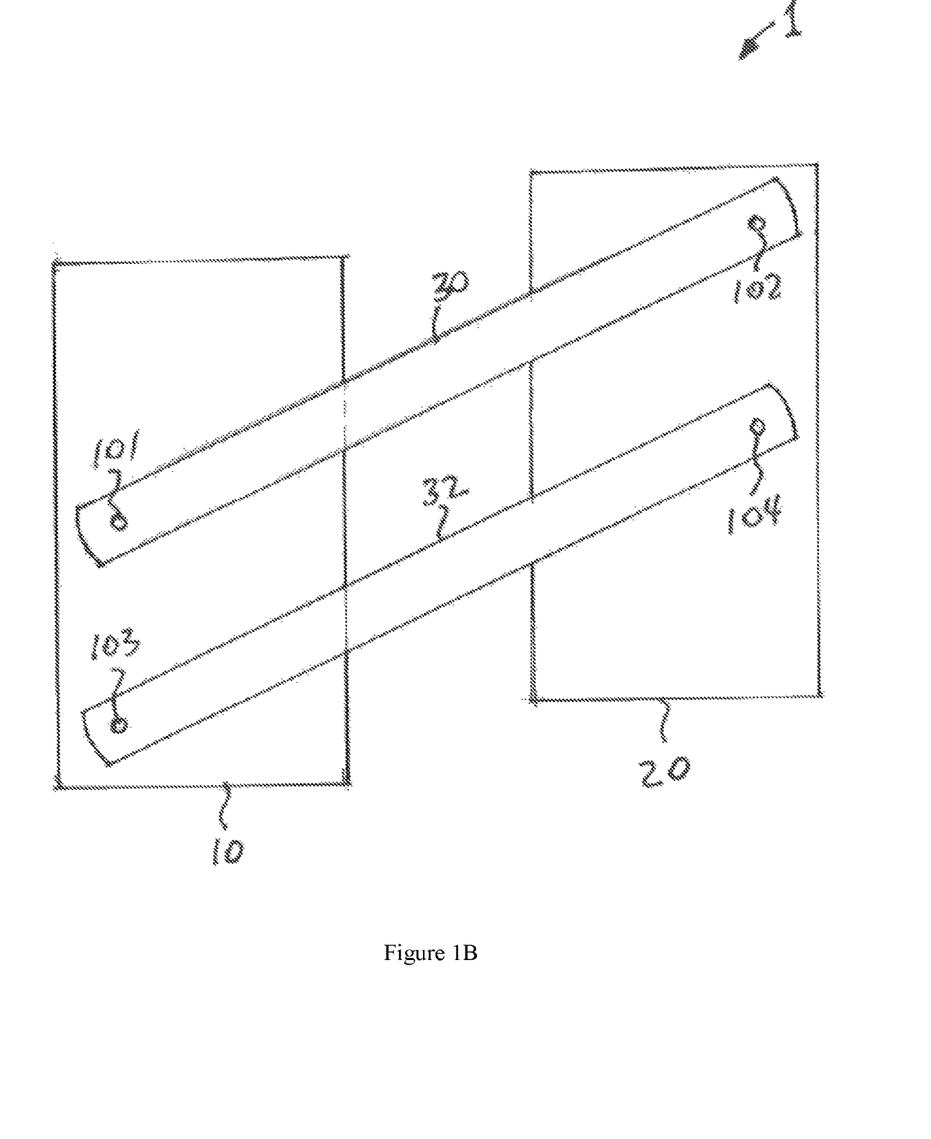
FIG. 1B illustrates a schematic bottom (or underside) view, elements of the self-aligning device of FIG. 1A.

The operational principles of the self-aligning device are best explained with reference to FIGS. 1A and 1B which respectively illustrate a schematic top view, elements of a self-aligning device and a schematic bottom (or underside) view, elements of the self-aligning device. In these figures, waveguide deflectors have been omitted for the sake of clarity, but such are shown in later drawing figures. FIGS. 1A and 1B are simplified drawings which illustrate the operating principles of the self-aligning device, and the relative positioning of parts thereof, including the placement of pivots with regards to the parts thereof As is seen from FIGS. 1A and 1B, the self-aligning device 1 comprises various mechanical parts or elements which are interconnected via a plurality of pivots. Included are a first base platform 10 and the second base platform 20 which are movable with respect to each other and are optionally but very preferably generally coplanar. Each of the first base platform 10 and second base platform 20 are essentially planar in nature and may include mounting feet (as described in later drawings). Each of the first base platform 10 and second base platform 20 are interconnected by a series of mechanical elements including a pair of lower control arms 30, 32 which are connected to the underside of the first base platform 10 and second base platform 20 via pivots. Namely pivots 101, 102 at or near opposite end of the first lower control arm 30 which connect it to the first base platform 10 and the second base platform 20. Similarly pivots 103, 104 which are at or near opposite ends of the second lower control arm 32 connected to the first base platform 10 and the second base platform 20. Is to be noted that the placement of the pivots 101-104 are such that they, and their pivot points define a parallelogram between pivots 101-104 such that any translational motion of either the first base platform 10 and the second base platform 20 with respect to each other are maintained in a parallel relationship.

Returning now to the schematic top view presented by FIG. 1A, (wherein certain of the features of FIG. 1B have been omitted for the sake of clarity, but which are nonetheless understood to be present) the second base platform 20 includes on its upper surface 21, a second movable waveguide deflector mount 30 which is mounted to the second base platform 20 via a centrally located pivot 110. It is to be understood of that the position of this centrally located pivot 110 permits for the free rotation of the movable waveguide deflector mounts 30 and also acts as a pivot for a second upper control arm 52 which may also be freely rotatable thereabout. The first base platform 10 includes on its upper surface 11 a first movable waveguide deflector mount 40 which similarly includes a centrally located pivot 112 by which it is rotatably mounted to the first base platform 10, and is freely rotatable thereabout. Pivot 112 is also affixed to and acts as a pivot for the second upper control arm 52, but pivots 110, 112 are at or near the opposite ends of the second upper control arm 52. Offset from pivots 110, 112 are pivots 114, 116 which are affixed at or near opposite ends of the first upper control arm 50 which is parallel to the second upper control arm 52. Pivots 114, 116 are also respectively affixed to or mounted on the second waveguide deflector mount 30 and the first waveguide deflector mount 40 and permit for the rotational displacement of the first upper control arm 50 with respect thereto. As is understood from FIG. 1A, the positioning of the pivots 110-116 with respect to the first upper control arm 50 and second upper control arm 52 establishes a parallelogram between the pivot points of the pivots 110-116, such that thereby any displacement or rotational movement of the first movable waveguide deflector mount 40 is translated to the second movable waveguide deflector mount 30, and vice-versa. Further, any relative movement of the first base platform 10 and second base platform 20, imparts a displacement upon centrally located pivots 110 and 112, which displacement imparts a further displacement which may be translated to the first movable waveguide deflector mount 40 and the second movable waveguide deflector mount 30 via the upper control arms 50, 52.

A spring (when present) may be attached between two or more elements of the self-aligning device in order to provide a tensile, or compressive force therebetween. Such may be useful for example, wherein the self-aligning devices used in a dynamic environment, and one or more parts of the self-aligning device may be moved to translated while radiation passes through said device. One or more such springs may be provided in any suitable location including but not limited to: between the base platforms 10, 20; between a base platform 10, 20 and one or both of the upper control arms 50, 52 and/or one or both of the lower control arms 30,32; between one or more of the movable waveguide deflector mounts 30, 40 and their corresponding base platforms 10, 20. Advantageously a spring is attached between each of the first movable waveguide deflector mount 40, and the second movable waveguide deflector mount 30. A plurality of springs may also be simultaneously be present within the device; such one or more springs may also be present in other positions and connecting other parts or elements of the self-aligning device 1 other than disclosed herein, or depicted in the drawings.

The self-aligning device 1 also includes a control rod 60 which extends outwardly from the first waveguide deflector mount 40 and which is perpendicular to the pivot point of the centrally located pivot 112. A part of the control rod 60 is slidably connected to a sleeved pivot 62. Also present are two equalizer arms 70, 72. A first equalizer arm 70 has a pivot 118 at or near one end thereof which is mounted or affixed to a part of the first base platform 10, and may be rotated or otherwise translated with respect thereto, and at or near the other end of the first equalizer arm 70 is affixed or otherwise mounted the sleeved pivot 62. A second equalizer arm 72 is has a pivot 120 at or near one end thereof, which pivot 120 is mounted or affixed to a part of the second upper control arm 52, and may be rotated otherwise translated with respect thereto, and, at or near the other end of the second equalizer arm 72 is affixed or otherwise mounted the sleeved pivot 62. With attention to FIG. 1A, is be understood that the distance between pivot points of pivot 112 and pivot 118 is equidistant as the distance between the pivot points of pivot 112 and pivot 120. Also, the distance between pivot points of 118 and sleeved pivot 62 is equidistant as the distance between points of pivot 120 and sleeved pivot 62. The sleeved pivot 62 allows for the control rod 60 to slide therethrough when the relative position of the sleeved pivot 62 changes with respect to the control rod. This occurs when the relative positions of the first base platform 10 and the second base platform 20 may change, as when the relative positions of the first base platform 10 and the second base platform 20 are changed, the position of the second upper control arm 52 also is invariably changed which thereby imparts a motive force upon the second equalizer arm, which is translated to the first equalizer arm 70, and which motive force causes the displacement of the sleeved pivots 62. In preferred embodiments, such as shown in the FIG. 1A, pivot points of pivots 112, 118 and 62 define a triangle whose dimensions are equal to a triangle defined by pivot points of pivots 112, 120 and 62. Preferably (although not necessarily) as the dimensions of these defined triangle are equal, the angle made between the pivot point 118 and the sleeved pivot 62 and its pivot point, is one half of the angle between pivot 118 and its pivot point, and pivot 120 and its pivot point, and as pivot 120 is preferably collinear with the pivots 110, 112 and their respective pivot points, this relationship is maintained between the deflectors (i.e., mirrors, or other) present upon the waveguide deflector mounts 30, 40. Preferably also the vertical axis of any deflector present on a waveguide deflector mount 30, 40 is also coincident with the pivot point of respective pivots 110, 112. Further, a line or plane defined as passing through pivot points of pivots 112, 116 are maintained in a parallel relationship to a line or plane defined as passing through pivot points of pivots 110, 114. This relationship is maintained regardless of the relative respective positions of the first base platform 10 in the second base platform 20.

While the foregoing describes a preferred embodiment, it is to be understood that the However in other embodiments it is understood that the relative dimensions of elements and position of pivots may be established such that angle other than one-half of the angle between pivot 118 and its pivot point, and pivot 120 and its pivot point, and as pivot 120 is formed. Such may be easily done by changing the dimensions between the pivot point of sleeved pivot 62, and one or both of pivots 118 and/or 120 and their respective pivot.

In preferred embodiments, the self-aligning device maintains critical geometric relationships between parts or elements thereof, which relationships, including the two defined parallelograms described above, viz., a parallelogram between pivots 101-104 and a further parallelogram between pivots 110-116.

The foregoing describes essential features of a self-aligning device which automatically adjusts waveguide deflectors present in the device, in order to couple radiation between two or more offset or non-collinear locations or point, in which (for the sake of clarity) further useful parts or elements have been omitted. The following figures add such further useful parts or elements and aid in the understanding of the self-aligning device and how it forms part of a self-aligning waveguide deflector device.

Figure 2A:
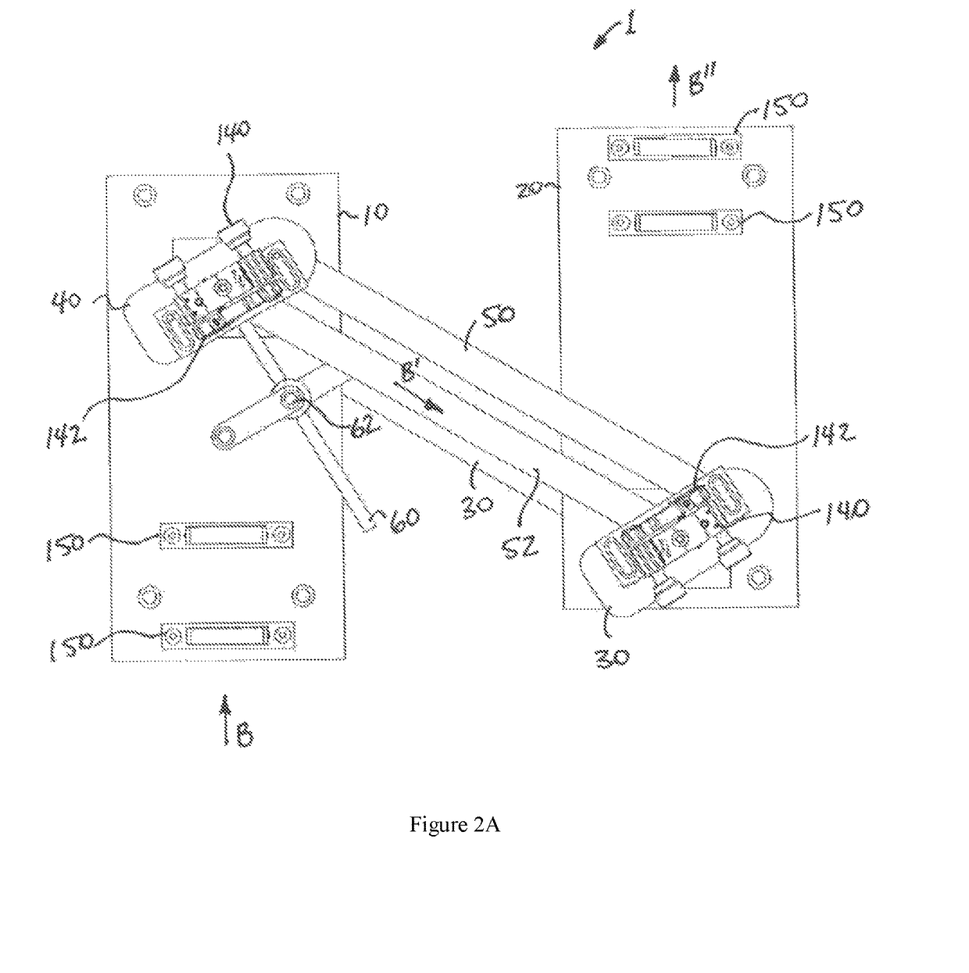
FIG. 2A illustrates in a top view, an embodiment of a self-aligning waveguide deflector device in a first position.
Figure 2B:
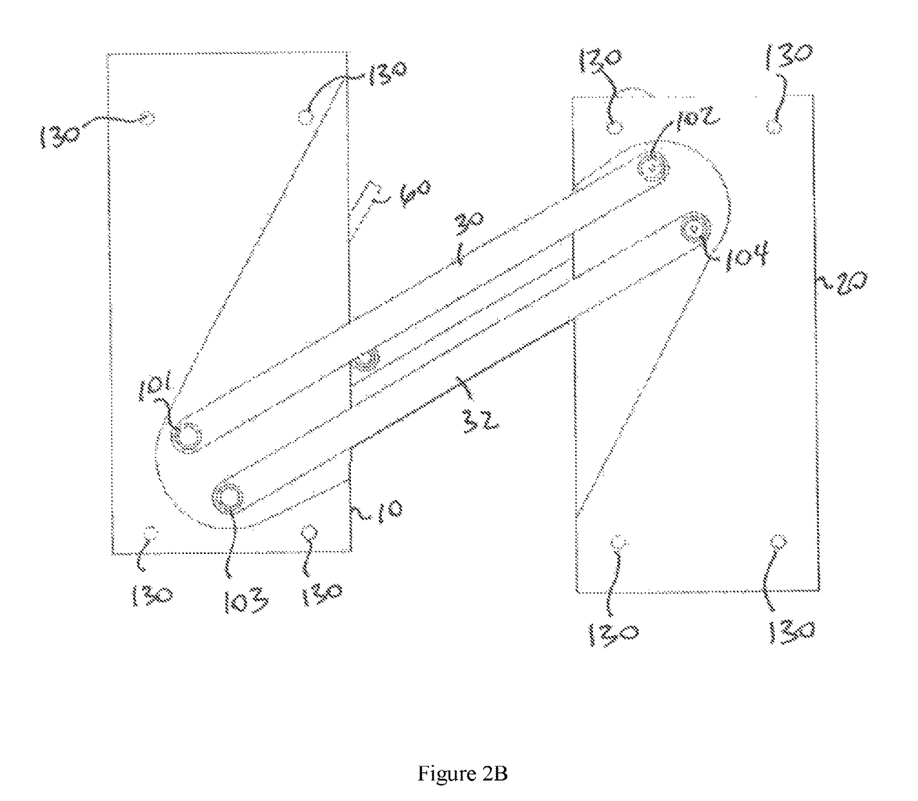
FIG. 2B illustrates in a bottom (or underside) view, the embodiment shown in FIG. 2A.

FIG. 2A illustrates in a top view, an embodiment of a self-aligning waveguide deflector device 1 in a first position, and FIG. 2B illustrates in a bottom (or underside) view of the same embodiment. In addition to the elements disclosed in FIGS. 1A, 1B, the present embodiment therein illustrated includes a plurality of mounting, feet 130, as well as a waveguide deflector mount apparatus 140 which is affixed to each of the first movable waveguide deflector mount 40 and the second movable waveguide deflector mount 30, and each of the waveguide deflector mount apparatus 140 includes as a part thereof a waveguide deflector 142 whose position with respect to the waveguide deflector mount apparatus 140, and thereby to each of the first movable waveguide deflector mount 40 and second movable waveguide deflector mount 30 maybe finally attuned and adjusted as desired. Most preferably, the waveguide deflectors 142 are maintained in a parallel relationship with respect to each other. Each of the first base platform 10 and second base platform 30 include one or more equipment mounts 150 which are preferably as providing means for the retention of further apparatus, such as optical equipment, radiation sources, radiation collectors, or other with respect to the self-aligning waveguide deflector device 1. In a preferred embodiment, an impinging source of radiation, illustrated by arrow B supplied by suitable source is directed into the self-aligning waveguide deflector device 1, wherein it impinges upon the waveguide deflector 142 associated with the first movable waveguide deflector mount 40, which (at least partially) redirects it, as depicted by arrow B', in the direction of the waveguide deflector 142 associated with the second movable waveguide deflector mount 30, which in turn (at least partially) redirects it, outward from the self-aligning waveguide deflector device 1 is represented by arrow B". In this manner, radiation may be transferred or coupled between two or more offset or non-collinear locations or points. Such a transferal or coupling can be simultaneously bidirectional as well.

Figure 3A:
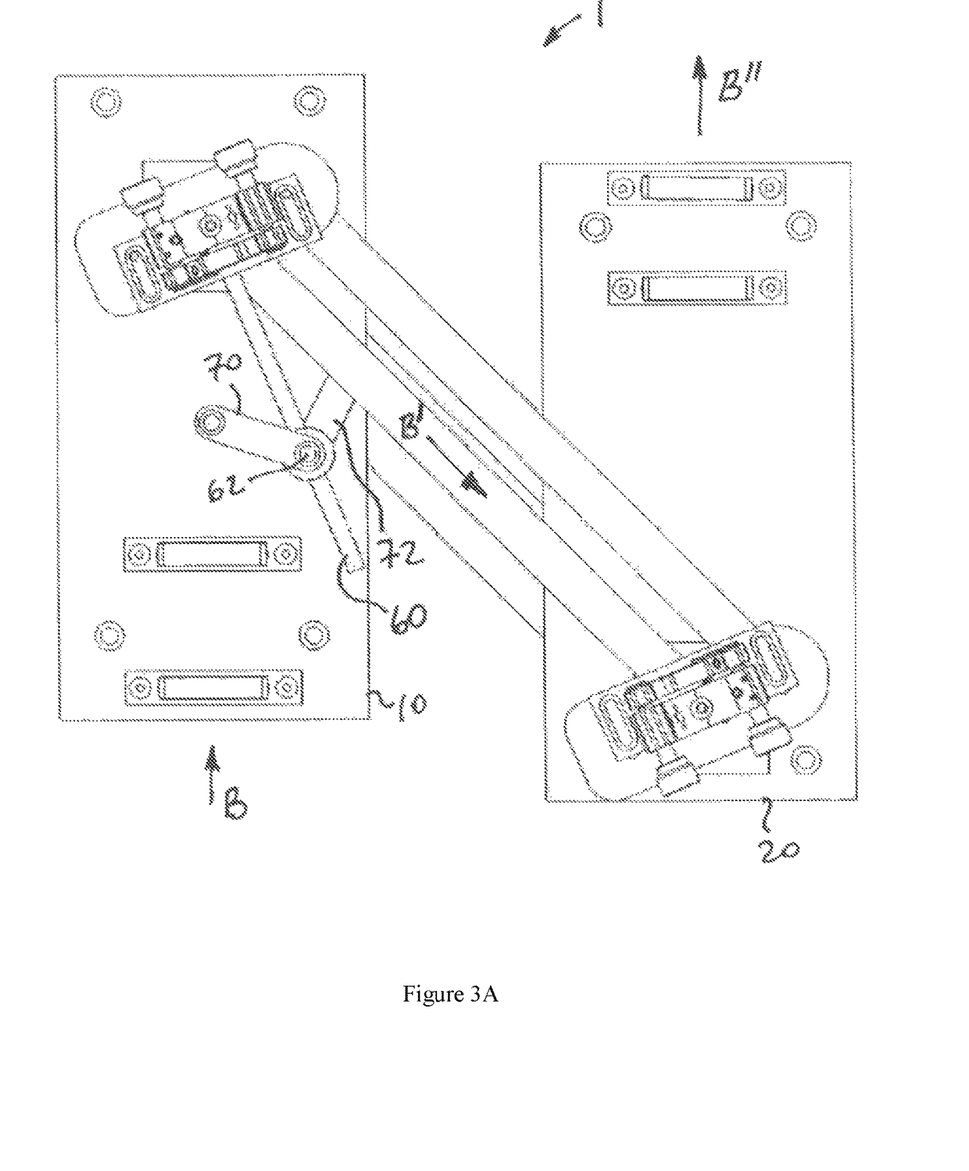
FIG. 3A illustrates in a top view, an embodiment of a self-aligning waveguide deflector device in a first position.
Figure 3B:
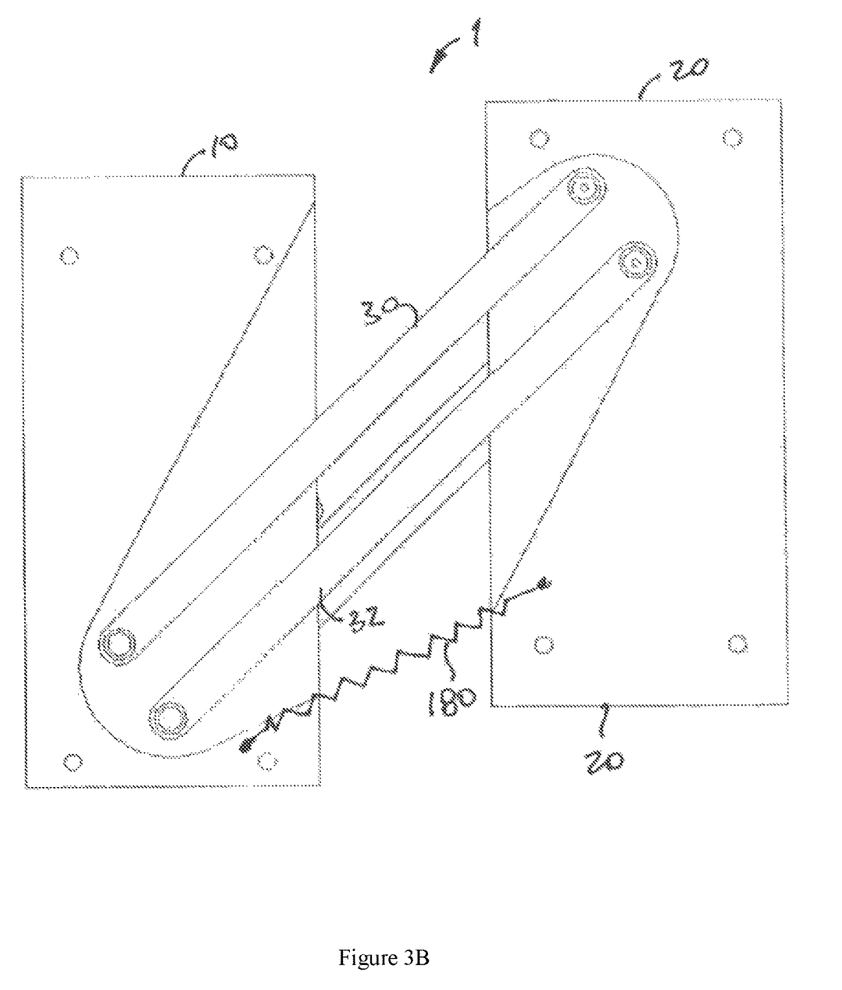
FIG. 3B illustrates in a bottom (or underside) view, the embodiment shown in FIG. 3A.

FIG. 3A illustrates in a top view, an embodiment of a self-aligning waveguide deflector device previously illustrated in FIGS. 2A and 2B, and FIG. 3B illustrates in a bottom (or underside) view, the embodiment shown in FIG. 3A. In addition to the depiction of a spring 180 interconnecting the first base platform 10 in the second base platform 20, the embodiments illustrated on FIGS. 3A, 3B differ from those illustrated on FIGS. 2A and 2B and in that the positions of various elements have been translated, as the first base platform 10 and second base platform 20 have been moved, and are now closer together. Such is also manifested by a change in the positioning of the sleeved pivot 62, and the two control arms 70, 72 with respect to the control rod 60. Notwithstanding this translation of the first base platform 10 and second base platform 20, the self-aligning device maintains the relative positions of the radiation passing into (represented by arrow B) and exiting the device (represented by arrow B") is maintained.

Figure 4A:
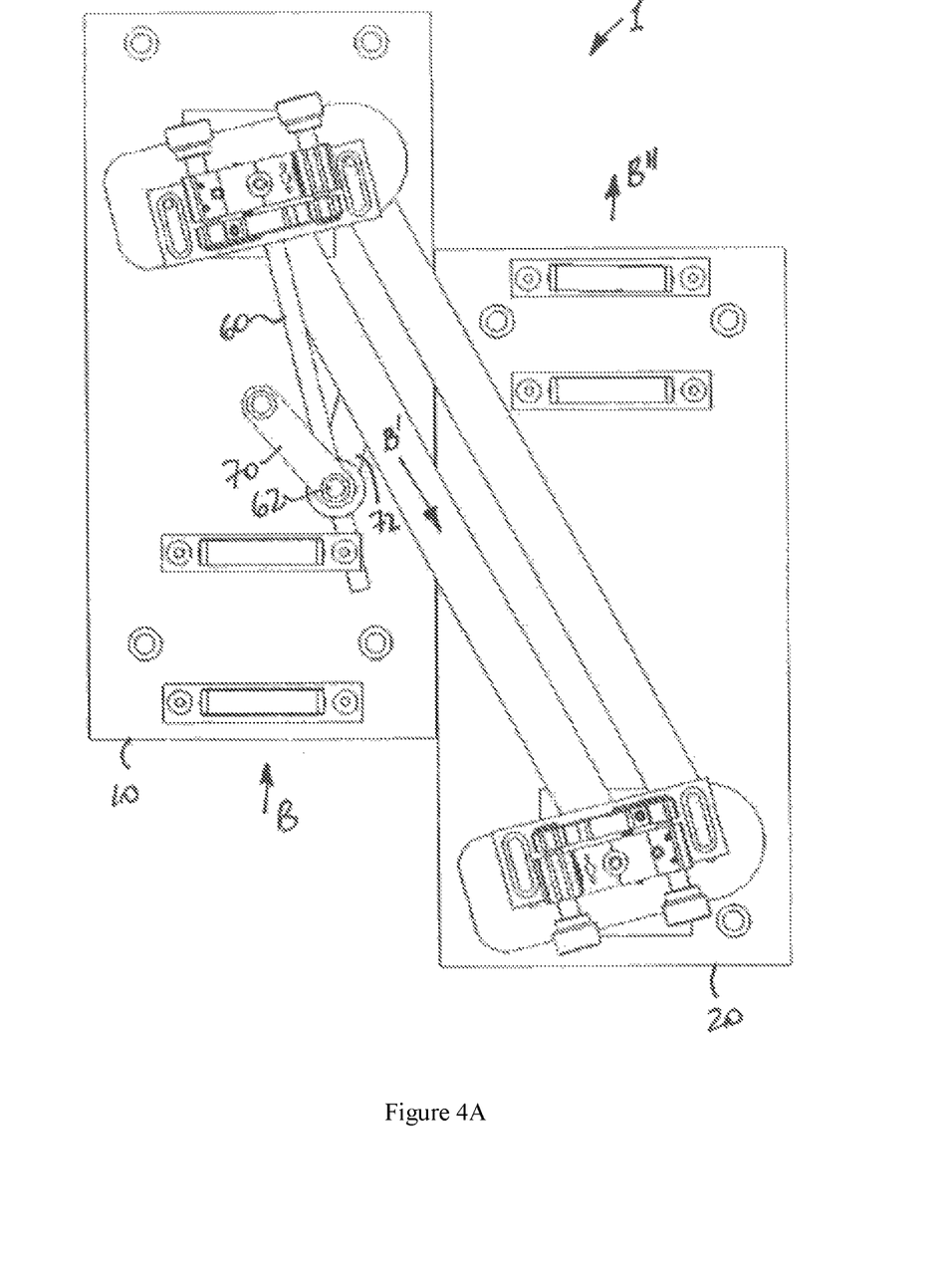
FIG. 4A illustrates in a top view, an embodiment of a self-aligning waveguide deflector device in a first position.
Figure 4B:
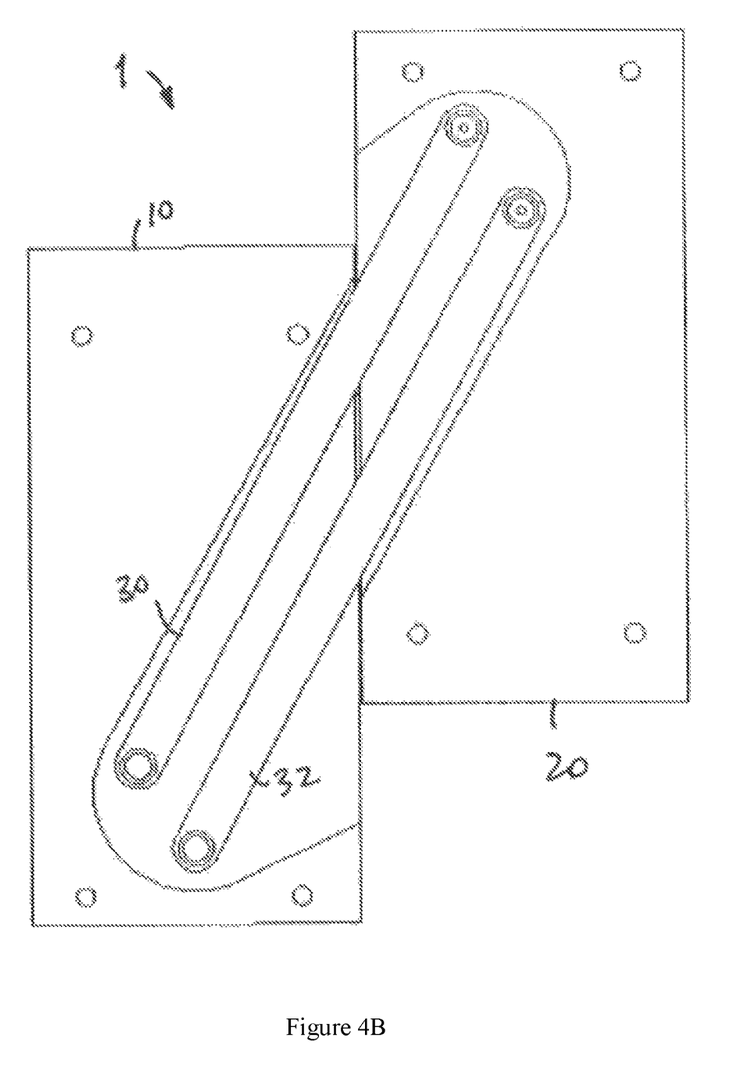
FIG. 4B illustrates in a bottom (or underside) view, the embodiment shown in FIG. 4A.

FIG. 4A illustrates in a top view, an embodiment of a self-aligning waveguide deflector device previously illustrated in FIGS. 2A, 2B, as well as 3A, 3B, while and FIG. 4B illustrates in a bottom (or underside) view, the embodiment shown in FIG. 4A. Similarly to the above, the embodiments depicted on FIGS. 4A, 4B differ from those illustrated on FIGS. 2A, 2B as well as 3A, 3B only in that the positions of various elements have been translated, as the first base platform 10 and second base platform 20 have been moved, and are now closer together than as shown in FIGS. 3A, 3B. Such is also manifested by a change in the positioning of the sleeved pivot 62, and the two control arms 70, 72 with respect to the control rod 60. Notwithstanding this translation of the first base platform 10 and second base platform 20, the self-aligning device maintains the relative positions of the radiation passing into (represented by arrow B) and exiting the device (represented by arrow B") is maintained.

Figure 5:
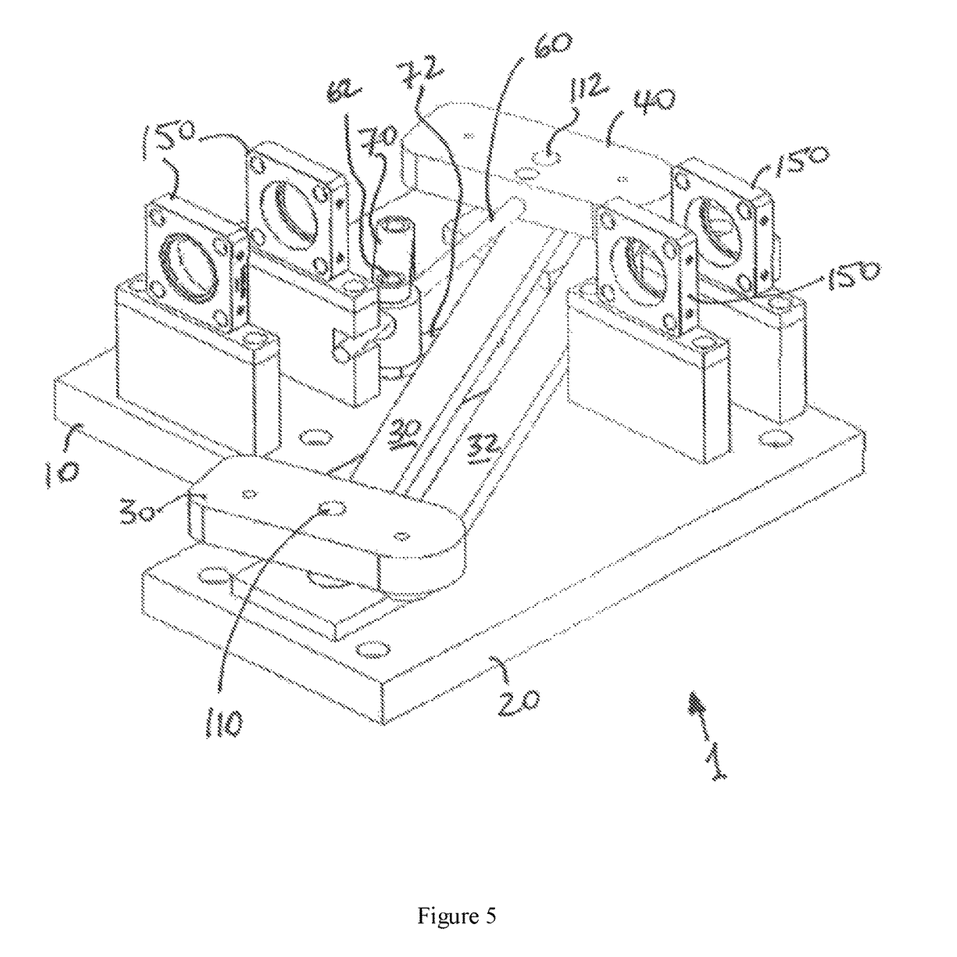
FIG. 5 provides an isometric view of the embodiment depicted of FIGS. 2A-4B.

FIG. 5 provides an isometric view of the embodiment depicted of FIGS. 2A-4B, and illustrates in further detail the relationship of the various elements and parts of the device 1 discussed with reference to FIGS. 2A, 2B, 3A, 3B, 4A and 4B except that the waveguide deflector mount apparatus 140 for the purpose of clarity. As is also better seen in this figure is the configuration of the sleeved pivot 62, the control rod 60 passing through a part thereof, and the two control arms 70, 72.

The self-aligning device is advantageously used in the alignment of a laser beams, as mirrors (or deflectors) mounted on the waveguide platforms are automatically aligned and remain aligned even if one element of the self-aligning device moves; such allows for the successful translation of a laser beam on one axis without sacrificing its alignment. Such a benefit is also realized by any optical beam which may be translated via the self-aligning device. Such may be achieved by assuring that the vertical axis of a deflector mounted on a waveguide platform is coincident with the pivot point of the waveguide platform, as is illustrated in the drawings. Indeed, the self-aligning device can be used in any photonics application, e.g., and may be used in applications such as single photon applications, quantum computing, interferometry, laser welding, and other applications in which reorientation or redirection of a radiation source via a waveguide such as an optical fiber waveguide is not possible. Such is particularly true of high power laser applications, such as welding, optical trapping, optical laser thrusters and other similar applications.

The self-aligning device can be used to direct microwaves through two offset waveguides that are moving relative to one another. The self-aligning device may be used in application in which the two offset waveguides are static with respect to each other and/or with respect to the self-aligning device. The self-aligning device may also be used in any similar application where two waveguides or optical fibers are offset and possess relative motion among them, and may also be used in optical applications, substituting flat mirrors for waves with small spot sizes such as lasers.

In a certain preferred aspect, the disclosed self-aligning device operates to maintain critical geometric relationships necessary to allow for wave passage while adapting to externally driven fluctuations. In such an embodiment, it has a 1-to-1 (or "1:1") magnification ratio, meaning that the distribution of radiation at one end of the device, i.e. the object, produces an image of the same size at the other end of the device, i.e. the image plane. The distance from one waveguide from which a source or radiation in supplied to the device to a first mirror is 1 focal length, between the two mirrors is 2 focal lengths, and from the second mirror to second waveguide to which radiation exiting the device is 1 focal length. This configuration is sometimes referred to as a Gaussian telescope when the radiation has the distribution of a Gaussian beam. When a magnification of the radiation field is required, e.g. coupling two waveguides or optical fibers of different diameter, the focal lengths of the constituent mirrors can be changed to produce such an effect. The two 1-focal-length lines are kept parallel at all times through the series of mechanical linkages and elements of the device. The angles between the 1-focal-length lines and the 2-focal-length line, which are alternate interior angles, are congruent to one another and are bisected by the center of the mirrors for all displacement cases, allowing a wave to pass.

Notwithstanding the foregoing it is to be understood that while a 1:1 magnification ratio may be established and used with the device, other magnification ratios may also be used as well, as may be the case wherein two (or more) waveguides, fibers, detectors, etc. are different sizes, then the focal length ratio of the two mirrors (or deflectors) may be established to have a magnification ratio other than 1:1.

In another aspect of the present invention, the disclosed self-aligning device may be used to automatically, or self-align optical beams, e.g., laser beams. The device may be configured and operated such that mirrors present are automatically adjusted so that an aligned laser beam remains aligned even if only one arm of the mechanism moves, which allows for the successful translation of an optical beam on one axis, without materially altering its alignment.

The device according to the invention may be used in applications which are not limited to the alignment of lasers, or light beams, but may be used in other applications, i.e. in other photonics applications, such as single photon applications, quantum computing, interferometry, cold and ultracold physics, cold and ultracold chemistry. One particular further application includes the use of the device in translation of laser applications, e.g., high power laser applications, in which an optical fiber cannot be used to direct the laser beam., such as in laser cutting, laser welding and similar applications. The device according to the invention may be used in any application wherein the translation of a photonic beam, i.e, a laser beam, between two different non-colinear relative orientations is desired or necessary.

The device according to the invention may also be used in one or more of the following specific applications:

a) In laser and infra-red systems: coupling free-space light paths, coupling optical fibers; telecommunications, remote sensing (e.g. telemetry, interferometry, LIDAR, and the like.), industrial applications (e.g., laser etching, 3D printing, surface processing, semiconductor fabrication, and the like.), medical applications (laser treatment and diagnostics)
b) In microwave and RF systems: coupling antenna, detector, and waveguide systems; wireless telecommunications systems (i.e., both satellite and ground-based), radar (including but not limited to dust/cloud penetrating radar for aerospace and motor vehicle applications), industry (i.e., materials processing, food sterilization, plasma heating, and the like), medical applications (i.e., sterilization, non-invasive diagnostics, biometric sensing), radio astronomy, security applications (i.e., security screening, remote-sensing and detection, etc.)
c) optical imaging systems such as but not limited to optical cameras including those used in scanning microscopy, periscopes, and telescope configurations.

The invention claimed is:

1. A self-aligning waveguide deflector device which automatically adjusts deflectors present in the device, to thereby couple radiation between two or more offset or non-collinear locations or points, the device comprising:
a first base platform and a second base platform;
a first lower control arm connected to each of the first base platform the second base platform via pivots;
a second lower control arm connected to each of the first base platform and the second base platform via pivots;
wherein the first lower control arm, the second lower control arm and the pivots upon which they are mounted define a first parallelogram;
a first moveable waveguide deflector mount mounted via a centrally located pivot to the first base platform;
a second moveable waveguide deflector mount mounted via a centrally located pivot to the second base platform;
a first upper control arm mounted via the said centrally ted pivots;
a second upper control arm mounted via pivots to the first moveable waveguide deflector mount and the second moveable waveguide deflector mount;
wherein the first upper control arm, the second upper control arm and the pivots Ripon which they are mounted define a second parallelogram;
a control rod extending outwardly from the first waveguide deflector mount and which is perpendicular to the centrally located pivot of the first waveguide deflector mount, a portion of the control rod in sliding engagement with a sleeved pivot, sleeved pivot mounted in a first equalizer arm and in a second equalizer arm,
the first equalizer arm mounted via a pivot to a part of the first base platform;
the second equalizer arm mounted via a pivot to a part of the second upper control arm;
wherein the distance from the sleeved pivot and the further pivot of the first equalizer arm is equal to the distance from the sleeved pivot and the further pivot of the second control arm; and, and the distance between the centrally located pivot of the first waveguide deflector mount and the further pivot of the first equalizer arm is equal to the centrally located pivot of the first waveguide deflector mount and the further pivot of the second equalizer arm;
and, the first base platform and the second base platform are moveable with respect to one another; wherein
a first waveguide deflector (mirror) at a determined distance from a first offset waveguide creates a first focal length;
a second waveguide deflector (mirror) at a determined distance from a second offset waveguide creates a second focal length,
wherein the distance between the first mirror and second minor create a third focal length, and the angles between the first and second focal lengths, and third focal length are alternate interior angles, congruent to one another and bisected by the center of the mirrors to allow for wave passage.

2. The waveguide device of claim 1, wherein the distance from one waveguide to the first mirror is 1 focal length, the distance between the two mirrors is 2 focal lengths, and the distance from the second mirror to the second waveguide is 1 focal length.

3. A method for coupling two waveguides or radiation sources/radiation collectors which are offset or non-collinear with respect to each other, which method includes the steps of:
providing a self-aligning device according to claim 1, and utilizing the said device deflect radiation passing through the said device.

4. The waveguide deflector device of claim 1, wherein the said first, second, and third focal lengths have a ratio of 1-2-1 focal lengths respectively.

5. The waveguide deflector device of claim 1, wherein one or more of the deflectors present in the device are mirrors.

6. The waveguide deflector device of claim 1, wherein one or more of the deflectors present in the device are flat mirrors.

7. The waveguide deflector device of claim 1, wherein one or more of the deflectors are minors which comprise waves with small spot sizes.

8. The waveguide deflector device of claim 7, wherein the waves with small spot sizes are lasers.

9. The waveguide deflector device of claim 1 which further includes at least one spring.

* * * * *